(12) United States Patent
Liang et al.

(10) Patent No.: US 9,809,213 B2
(45) Date of Patent: Nov. 7, 2017

(54) POWER SPLIT HYBRID ELECTRIC VEHICLE MOTOR TORQUE CONTROL USING STATE ESTIMATION

(71) Applicant: Ford Global Technologies, LLC, Dearborn, MI (US)

(72) Inventors: Wei Liang, Farmington Hills, MI (US); Thomas Chrostowski, Chesterfield, MI (US); Fazal Urrahman Syed, Canton, MI (US); Jeffrey Allen Doering, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 14/154,530

(22) Filed: Jan. 14, 2014

(65) Prior Publication Data

US 2015/0197234 A1    Jul. 16, 2015

(51) Int. Cl.
*B60W 20/00* (2016.01)
*B60L 15/20* (2006.01)
*B60W 20/10* (2016.01)
*B60K 6/365* (2007.10)
*B60K 6/445* (2007.10)
*B60W 10/08* (2006.01)

(52) U.S. Cl.
CPC ............ *B60W 20/10* (2013.01); *B60K 6/365* (2013.01); *B60K 6/445* (2013.01); *B60L 15/20* (2013.01); *B60W 10/08* (2013.01); *B60W 20/00* (2013.01); *B60W 2510/0638* (2013.01); *B60W 2510/081* (2013.01); *Y02T 10/6239* (2013.01); *Y02T 10/7258* (2013.01); *Y10S 903/903* (2013.01)

(58) Field of Classification Search
CPC .... B60L 15/00; B60L 15/20; B60L 2240/486; B60L 2240/423; B60L 2240/421; B60L 2240/441; B60L 2240/443; B60W 20/10
See application file for complete search history.

(56) References Cited

U.S. PATENT DOCUMENTS

| 6,490,511 | B1 * | 12/2002 | Raftari | ................... B60K 6/365 180/65.1 |
| 7,577,507 | B2 | 8/2009 | Morris | |
| 7,739,016 | B2 | 6/2010 | Morris | |
| 8,050,821 | B2 | 11/2011 | Morris et al. | |

* cited by examiner

*Primary Examiner* — Mussa A Shaawat
*Assistant Examiner* — Kyung Kim
(74) *Attorney, Agent, or Firm* — David Kelley; Brooks Kushman P.C.

(57) ABSTRACT

A vehicle includes a traction motor coupled to a driveline. An engine and a generator are coupled to the driveline through a planetary gearset. A controller commands the traction motor torque based on a difference between a driver torque demand and an estimated powertrain torque. The estimated powertrain torque is based on an error between actual and estimated engine speed and an error between actual and estimated generator speed. The estimated powertrain torque may be further based on commanded or estimated engine torque and generator torque. The estimated powertrain torque may utilize a state estimator to calculate internal states based on the errors.

20 Claims, 4 Drawing Sheets

POWER SPLIT HYBRID ELECTRIC VEHICLE MOTOR TORQUE CONTROL USING STATE ESTIMATION

TECHNICAL FIELD

This disclosure relates to estimating a torque on a gear of a planetary gearset in hybrid electric vehicles.

BACKGROUND

A hybrid-electric vehicle (HEV) may be configured to transfer torque from an engine and one or more electric machines to the traction wheels. The torque at the traction wheels is a function of the engine torque and the electric machine torques. A power-split architecture combines the driving torque generated by the engine and the torque generated by one or more electric machines in various operating modes.

A representative power-split architecture is illustrated in FIG. 1. The two electric machines, referred to as the motor and the generator, may be implemented by permanent-magnet AC motors with three-phase current input. The engine and the generator may be connected by a planetary gear set with the engine crankshaft connected through the mechanical damper to the carrier and the generator rotor connected to the sun gear. The mechanical damper functions to transfer torque from the engine to the driveline and compensates for short power spikes caused by operation of the engine. The damper acts as a filter and prevents short acting torque pulses from being transferred through the driveline. The mechanical damper may also delay a rapid change in engine torque from being transmitted to the drivetrain. A gear on the motor output shaft may be meshed to a counter shaft with a fixed ratio. The ring gear may also be connected to the counter shaft in a fixed ratio arrangement.

The driveshaft torque is a function of the motor torque and the ring gear torque. The ring gear torque is affected by the engine and generator torques. During a transient event in which engine torque is changing, the engine speed and ring gear speed may be different due to deflection of the mechanical damper. During these transient events, the engine torque may not immediately affect the driveshaft torque. It may be desirable use the faster acting motor to generate torque to fill in for the delayed engine torque. However, to provide a correct amount of additional torque to the motor, the amount of engine torque that is missing must be estimated. In the hybrid powertrain described, an estimate of the ring gear torque is an important quantity.

A prior art estimate of the ring gear torque is based on the generator torque and the generator inertia as follows:

$$\hat{\tau}_r = \frac{1}{\rho}(\tau_g - J_g \dot{\omega}_g)$$

where $J_g$ is the lumped moment of inertia of the generator and the sun gear. This particular calculation of ring gear torque creates a positive feedback loop in some situations that may magnify driveline oscillations created by any disturbances. This calculation is also not robust to measurement noise and system disturbances. The calculation is based on the derivative of generator speed and noise on the generator speed signal may cause noisy derivatives that affect the accuracy of the estimation. The generator speed signal may be filtered but this may introduce unacceptable delays in the control system.

SUMMARY

A vehicle includes a motor coupled to a driveline, an engine and a generator coupled to the driveline through a planetary gearset, and at least one controller. The controller is programmed to control the motor according to a difference between a driver torque demand and an estimated powertrain torque produced by the engine and generator based on an error between actual and estimated engine speed and an error between actual and estimated generator speed. The estimated powertrain torque may be further based on a commanded engine torque. The estimated powertrain torque may be further based on an estimated engine torque. The estimated powertrain torque may be further based on a generator torque. The planetary gearset may be configured to couple the engine and generator to the driveline via a ring gear of the planetary gearset and the estimated powertrain torque may be a torque at the ring gear. The estimated powertrain torque may be further based on a speed of the ring gear. The estimated powertrain torque may be further based on a speed of the ring gear filtered through a band stop filter to improve robustness to driveline dynamics. The error between actual and estimated engine speed may be a difference between a measured engine speed filtered through a band stop filter and the estimated engine speed. The error between actual and estimated generator speed may be a difference between a measured generator speed filtered through a band stop filter and the estimated generator speed.

A method for controlling a traction motor in a vehicle includes controlling, by at least one controller, traction motor torque according to a difference between a driver torque demand and an estimated powertrain torque produced by an engine and a generator, wherein the estimated powertrain torque is based on an error between actual and estimated engine speed and an error between actual and estimated generator speed. The method may further comprise filtering at least one of a measured engine speed and a measured generator speed through a band stop filter to improve robustness to driveline dynamics. The estimated powertrain torque may be further based on a commanded engine torque, an estimated engine torque, or a generator torque. The estimated powertrain torque may be an output of a state observer configured to drive the errors toward zero.

A powertrain includes a driveline, an engine, a generator, a planetary gearset configured to couple the engine and the generator to the driveline, a traction motor coupled to the driveline, and at least one controller. The controller is programmed to control the traction motor according to a difference between a driver torque demand and an estimated powertrain torque produced by the engine and the generator, wherein the estimated powertrain torque is based on a deviation in an estimated engine speed and a deviation in an estimated generator speed. The deviation in the estimated engine speed may be a difference between a measured engine speed filtered through a band stop filter and the estimated engine speed to improve robustness to driveline dynamics. The deviation in the estimated generator speed may be a difference between a measured generator speed filtered through a band stop filter and the estimated generator speed to improve robustness to driveline dynamics. The planetary gearset may be configured to couple the engine and generator to the driveline via a ring gear of the planetary gearset and the estimated powertrain torque may be a torque produced by the engine and the generator at the ring gear. The estimated powertrain torque may be further based on a speed of the ring gear. The estimated powertrain torque may be further based on a speed of the ring gear filtered through a band stop filter to improve robustness to driveline dynamics. The estimated powertrain torque may be estimated using a state observer including a model of the driveline.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
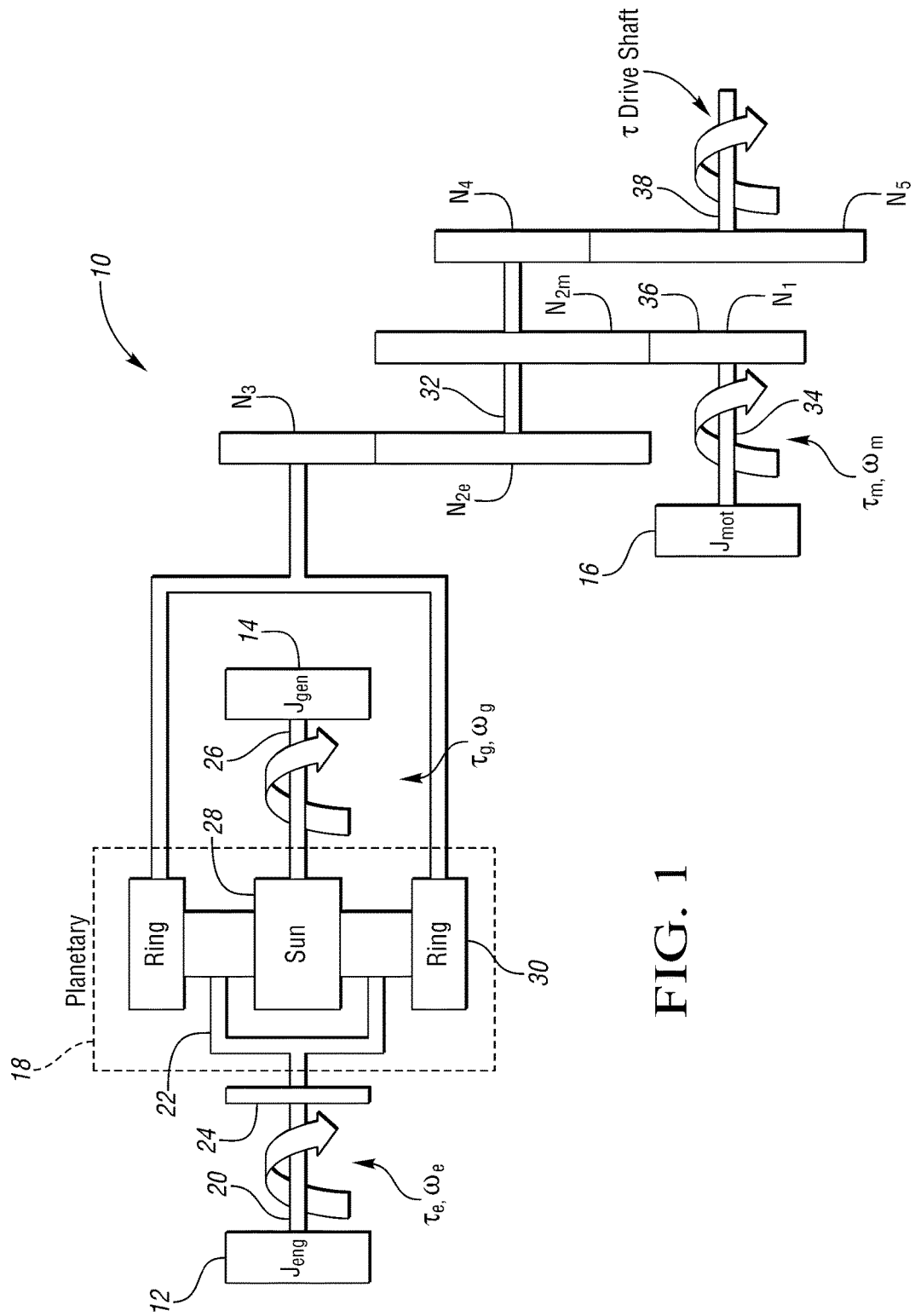
FIG. 1 illustrates a power-split architecture for a HEV in schematic form.

FIG. 1 depicts an example of a power-split hybrid vehicle architecture. The power-split architecture 10 combines the driving torque created by an engine 12 and the torque created by electric machines (14 and 16) to propel and decelerate the vehicle. The two electric machines 14, 16 used in the power split system 10, referred to as the motor 16 and the generator 14, may be permanent-magnet AC motors with three-phase current input. The engine 12 and the generator 14 are connected by a planetary gear set 18. The engine crankshaft 20 is connected to the carrier 22 through a mechanical damper 24 and the generator rotor 26 is connected to the sun gear 28. The ring gear 30 of the planetary gear set 18 may be connected to a counter shaft 32 with a fixed ratio. A gear 36 on the motor output shaft 34 may be meshed to the counter shaft 32 with a fixed ratio. The countershaft 32 may drive the vehicle final drive shaft 38 through a gear with a fixed ratio. Components including the drive shaft 38 and other components later coupled to the drive shaft 38 (e.g., differential, axle) may be referred to as a driveline. The ring gear 30 is coupled to the drive shaft 38 via the countershaft 32 and associated gears. The motor 16 is coupled to the drive shaft 38 via the countershaft 32 and associated gears.

This type of power-split system is known as an input power-split system. The planetary gear 18 set has two degrees of freedom. This means that two variables among the ring gear 30 speed, the carrier 22 speed and the sun gear 28 speed must be known before the third one may be calculated. This feature allows the engine 12 speed to be regulated by the generator 14 speed independent of the vehicle speed as long as no system constraints are violated. The torque relationships, however, on the planetary gear set 18 are fixed at any vehicle speed to engine 12 speed ratio. Such features of the planetary gear set 18 achieve the speed regulation function of a Continuously Variable Transmission (CVT) but without its torque multiplication function. It is normally referred to as the electrical CVT (eCVT) structure.

The engine 12 output torque is on a parallel path with the motor 16 output torque during any vehicle operation mode. This creates an important control problem of calculating the ring gear 30 torque in the motor torque controller.

The speed coupling of the planetary gear set 18 satisfies the following equation $$\frac{\omega_c - \omega_g}{\omega_r - \omega_c} = \frac{1}{\rho} \quad (1)$$

where $\omega_c$ is the rotational speed of the carrier, $\omega_r$ is the rotational speed of the ring gear, $\omega_g$ is the rotational speed of the generator shaft/sun gear), and the geometrical parameter $\rho = R_s/R_r$ represents the relative size of the sun gear 28 over the size of the ring gear 30. The torque relationships on the planetary gear set 18 are:

$$\tau_r = \frac{\tau_s}{\rho}, \tau_c = -\frac{1+\rho}{\rho}\tau_s \quad (2)$$

where $\tau_r$ is the ring gear torque, $\tau_s$ is the sun gear torque, and $\tau_c$ is the carrier torque.

The motor 16 is coupled to the driveline through the countershaft 32 in parallel to the engine 12 sourced torque output from the ring gear 30. The torque relationship among the driveshaft 38, the motor 16 and the ring gear 30 should satisfy the following equation $$\tau_d(t) = \rho_{d2m}\tau_m(t) - \rho_{d2r}\tau_r(t) \quad (3)$$

where $\tau_r$ is negative in the steady state. Equations (1), (2) and (3) may be used as the basis for vehicle control system design. The torque $\tau_d$ may be set equal to the driver demand torque.

The engine 12 speed may be different from the carrier 22 speed during a transient condition due to the deflection of the mechanical damper 24. The damper 24 may be designed with almost constant spring stiffness and provides some mechanical damping during most operations. The kinetic system of the engine 12 and the generator 14 may be modeled by the following state space equations $$\begin{cases} J_e\dot{\omega}_e = \tau_e - \tau_c \\ J_g\dot{\omega}_g = \tau_g - \tau_s \\ \dot{\alpha} = \omega_e - \omega_c \end{cases} \quad (4)$$

where $J_e$ is the engine 12 inertia, $J_g$ is the generator 14 inertia and $\alpha$ is the damper 24 angular deflection. The engine 12 torque $\tau_e$ is produced on the crankshaft 20. The torque transferred by the damper 24 is applied to the carrier 22 and may have the form $$\tau_c = k\alpha + c\dot{\alpha} \tag{5}$$

The generator 14 torque $\tau_g$ is produced by the electrical machine 14. The machine transient is omitted here due to its fast response time relative to the other dynamic response times within the system. The engine 12 torque output may be modeled using a variety of different models. As an example, a first order engine 12 torque model may be used in the motor control architecture. More complex engine torque modeling methods may be used.

A first order engine model may have the form $$\dot{\tau}_e = -\frac{1}{T}\tau_e + \frac{1}{T}\tau_e^{cmd} \tag{6}$$

where T is the engine torque response time and $\tau_e^{cmd}$ is the engine torque command.

Figure 2:
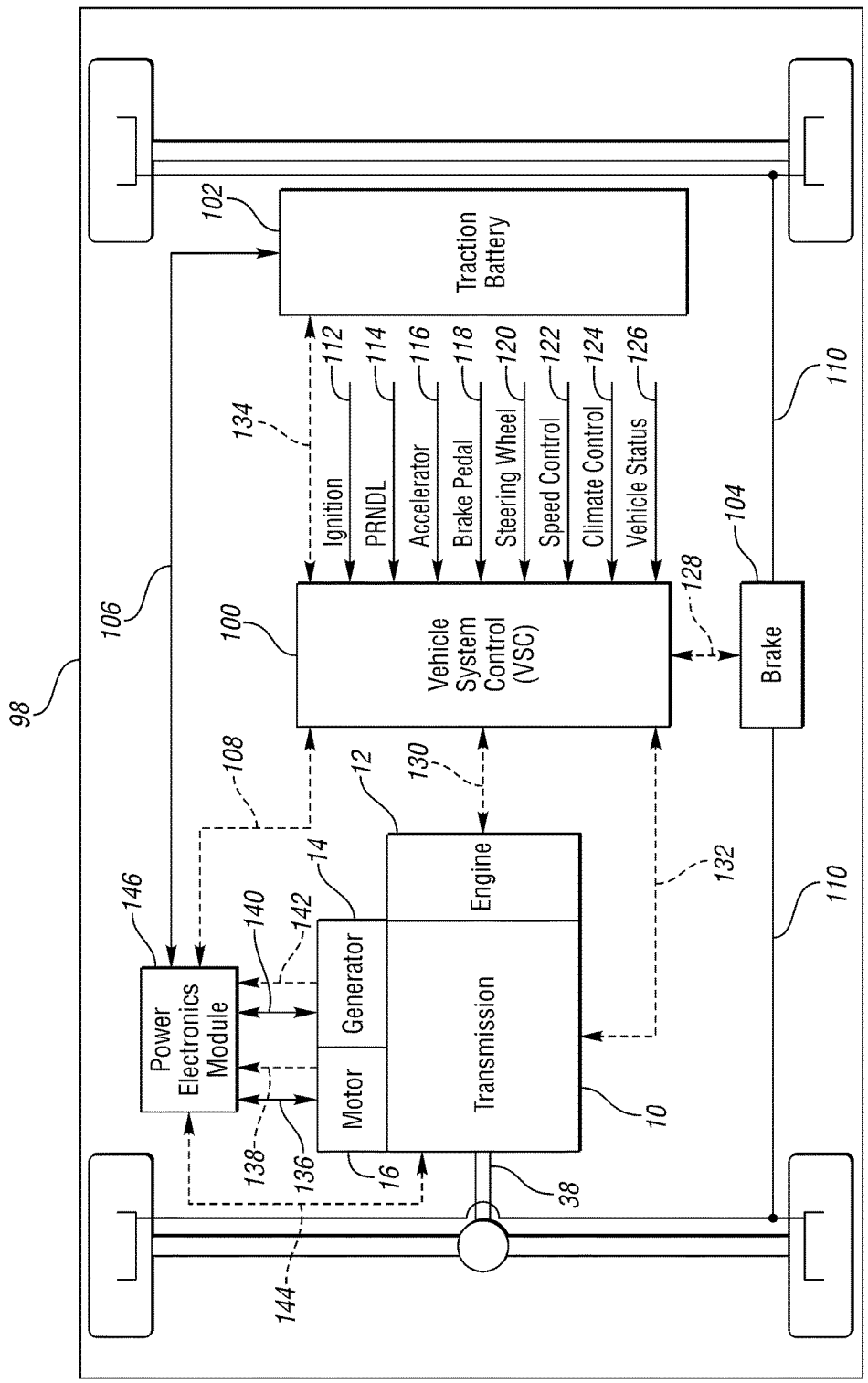
FIG. 2 is a block diagram illustrating a vehicle control function.

FIG. 2 shows a vehicle control function and the relationship to the subsystem controls. An HEV 98 may have one or more controllers that control and manage various aspects of the HEV operation. The transmission 10 may be coupled to an engine 12, a motor 16, and a generator 14 to provide propulsion for the vehicle. The motor 16 and generator 14 may be coupled to one or more power electronics modules 146. The power electronics module 146 may control the operation of the motor 16 and generator 14. The power electronics module 146 may convert DC voltage 106 from the traction battery 102 to a three-phase AC current (136, 140) for the motor 16 and generator 14. In a regenerative mode, the power electronics module 146 may convert three-phase AC currents (136, 140) from the motor 16 and generator 14 to DC voltage 106 compatible with the traction battery 102. The power electronics module 146 may also receive sensor signals (138, 142) from the motor 16 and generator 14. The sensor signals (138, 142) may include motor and generator shaft speeds and temperatures. The power electronics module 146 may also have circuitry to measure motor and generator currents and voltages.

A Vehicle System Control 100 (VSC) module may be present that interprets a driver's demand, determines a vehicle operating mode, determines system and subsystem torque and power limits, and manages the engine 12 and battery 102 power split ratios during vehicle operation. The VSC 100 may also determine the engine operating point for system efficiency purposes and determine the wheel torque command to satisfy the driver's demand. The VSC 100 may communicate with subsystem control modules by any appropriate means. Means of communication may be via serial communication, such as CAN bus, or via dedicated hardware signals. The communications are represented in FIG. 2 as dashed lines between modules. Communication of control signals may be bi-directional between the VSC 100 and the subsystem modules.

The VSC 100 may command the subsystem control modules to deliver a desired system torque and speed. The transmission 10 may have an associated controller that implements a control functions related to the transmission. The transmission 10 may receive and interpret a wheel torque command from the VSC 100 and convert it to a motor torque command and a generator torque command. The transmission may communicate various control signals with the power electronics module 146. The control signals 144 may include motor and generator torque commands and motor and generator speed commands. In a similar manner, the power electronics module 146 may communicate control information to the transmission 10. The control information 144 may include motor and generator speeds, voltages, and torques.

The VSC 100 may use various inputs to determine the proper operating mode and the torque commands. Inputs may include an ignition key status 112, a transmission gear selector position 114 (e.g., PRNDL), an accelerator pedal input 116, a brake pedal input 118, a steering wheel input 120, a speed control input 122, and a climate control input 124. Other vehicle status inputs 126 may be received. Each of the inputs may represent multiple signals. The signals may be discrete hardware inputs or may be received from a serial communications bus. These signals may be used to calculate the driver demand torque.

The VSC 100 may generate control signals to control the operation of the powertrain. The VSC 100 may communicate with a controller associated with the engine to exchange various control signals 130. Controls signals 130 sent to the engine 12 may include an engine torque command and a start/stop request. Control signals 130 received from the engine 12 may include engine speed and torque.

The VSC 100 may communicate with a controller associated with the brake system 104. Control signals 128 sent to the brake system 104 may include a regenerative brake torque achieved by the electric machines and a friction torque command. Control signals 128 received from the brake system 104 may include an overall brake torque command, wheel speeds and friction torque applied. The brake system may be electrically or hydraulically (represented by 110) connected to brake modules at each wheel.

The VSC 100 may communicate with a controller associated with the traction battery 102. Control signals 134 sent to the traction battery 102 may include a contactor command. Control signals 134 received from the traction battery 102 may include battery voltage, current, power limits, and state of charge.

The VSC 100 may communicate with a controller associated with the power electronics module 146. Control signals 108 sent to the power electronics module 146 may include motor and generator torque and speed commands. Control signals 108 received from the power electronics module 146 may include motor and generator torque and speed, bus voltage, and motor and generator currents. A controller associated with the transmission 10 may also exchange control signals 144 with the power electronics module 146.

The VSC 100 may communicate with a controller associated with the transmission 10. Control signals 132 sent to the transmission 10 may include a wheel torque command. Control signals 132 received from the transmission 10 may include transmission output speed and torque. The VSC 100 may process the inputs and calculate a driver torque command.

The main functions of the motor 16 may include driving the vehicle in an electric-vehicle (EV) mode with full driver torque, compensating the ring gear torque output based on the driver torque command (known as the Motor Torque Compensation (MTC)), and damping the driveline oscillation. The driveline resonance mode may be excited by the motor torque input due to the fast response of the electric motor and the small damping ratio of the mechanical system. This may create a vehicle drivability issue and may require improved control of the motor torque. Active damping (anti-jerk, anti-shuffle) control may be desired for smooth operation of the HEV.

The power-split HEV is also known as a series-parallel type of hybrid electric structure. Referring again to FIG. 1, the motor 16 torque is on a parallel path to the ring gear 30 torque. The parallel path on the engine 12 side is constructed by the engine 12 through the planetary gear set 18 connected to the counter shaft 32. The other parallel path is the motor 16 torque transferred by the counter shaft 32. The transaxle control of the power-split HEV may determine an appropriate motor 16 torque command to satisfy the driver desired torque on the wheel at a given ring gear 30 torque output. During transient engine 14 operation, the ring gear 30 torque and the carrier 22 torque may not be exactly known due to the absence of a torque sensor in the system. Therefore, an estimation of the ring gear 30 torque may be essential for the motor 16 torque calculation.

The motor 16 torque may be calculated by using an estimated powertrain torque. The powertrain torque of interest may be the torque produced by the engine 12 and the generator 14 on the ring gear 30. In this example, the powertrain torque is the ring gear torque. In the absence of a torque sensor, an estimate of the powertrain torque may be utilized. The calculation may be expressed by $$\tau_m^{cmd}(t) = \tau_d^{cmd}(t)/\rho_{d2m} + \rho_{m2r}\hat{\tau}_r(t) \quad (7)$$

where $\tau_d^{cmd}$ is the driver wheel torque demand and $\rho_{d2m}$ and $\rho_{m2r}$ are gear ratios from the wheel to the motor and from the motor to the ring gear. This calculation may be referred to as the Motor Torque Compensation (MTC). The estimated ring gear torque output $\hat{\tau}_r$ may be an estimate of the torque derived from operation of the engine 12 and generator 14. In this mode of operation, any amount of the driver wheel torque command that is not generated by the engine may be achieved using the motor torque.

To calculate the powertrain torque on the engine torque path, the prior art transaxle control estimates the ring gear torque by using the generator torque and the generator inertia. In a transient condition, the sun gear torque may be calculated by the generator torque minus the generator inertia torque. The reflected ring gear torque may then be determined as $$\hat{\tau}_r = \frac{1}{\rho}(\tau_g - J_g \dot{\omega}_g) \quad (8)$$

where $J_g$ is the lumped moment of inertia of the generator and the sun gear.

The prior art uses equation (8) to determine the appropriate motor torque command. This calculation, although simple, creates challenges in the motor torque calculation. When such estimation is used, a positive feedback loop may be created. A positive feedback loop is undesirable in the control system since it may magnify the driveline oscillation created by any disturbance through the closed loop control system. A common observation is that an oscillation exists in torque signals, speed signals and system power signals when the condition occurs.

Additionally, the prior ring gear torque estimation of equation (8) is not robust to measurement noise and system disturbances due to the calculation of the acceleration term. In theory, equation (8) calculates the transient torque on the ring gear from the transient torque on the sun gear based on an inverse model of the system dynamics (from equation (4)). In practice, the estimate given by equation (8) is not perfect because of the actual measurement of the speed signal. Inevitably, the speed measurement $\omega_g$ introduces measurement noise and is also affected by system disturbances. When a derivative is calculated from the measured generator speed $\omega_g$, any noise and disturbances on this signal will affect the accuracy of the ring gear torque estimation. Rapidly changing noise pulses, when differentiated, may cause large errors in the calculation. To prevent this, heavy filtering is necessary for $\omega_g$ which introduces delays into the torque estimation. The delayed signal may affect the timing of the motor response.

Based on previous analysis, the prior art transaxle control may introduce driveline oscillation because of the method of the ring gear torque calculation. Thus, a more robust algorithm is desired. Disclosed is an example of a state observer based method to replace the prior calculation with an estimate that is more robust and less susceptible to noise.

Figure 3:
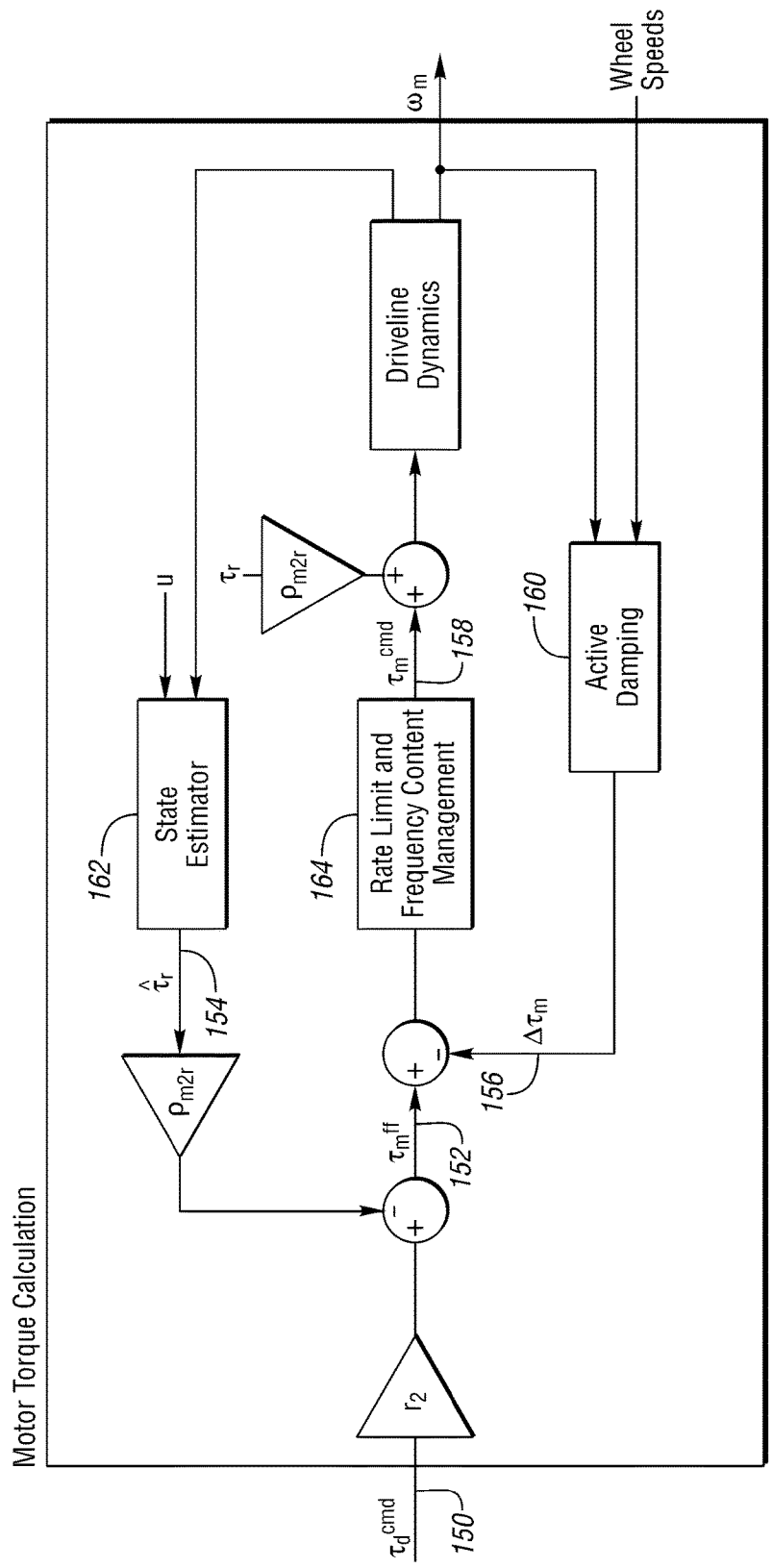
FIG. 3 illustrates a control for motor torque utilizing a state estimator.

The motor torque command determination may be an important feature of the power split HEV control. FIG. 3 shows an example of the major functions in the motor torque determination and their relative relationship. A feedforward term 152 of the motor torque command may be calculated based on the ring gear torque estimation 154 and the driver torque demand 150. An active damping feature 160 may adjust the motor torque 156 to damp out driveline oscillations. The active damping feature 160 may be a feedback mechanism based on a measure of the driveline oscillation. The motor torque may be rate limited and filtered 164 to avoid excitation of harshness during a lash crossing event. The motor torque command 158 may then be processed by the power electronics module to provide the actual motor torque. The motor torque may then be applied in conjunction with the engine and generator torques and the powertrain may respond according to the driveline dynamics.

The ring gear torque estimation 154 may be important for the accuracy and smoothness of wheel torque delivery. It should be robust to system disturbances and measurement noise, especially those excited by the driveline resonance. Disclosed is an example of using a state observer, or a state estimator 162, for estimating the unmeasured values of damper angular deflection $\alpha$, ring gear torque $\hat{\tau}_r$ and engine torque $\hat{\tau}_e$.

The system dynamics may be written in state space representation as follows:

$$\dot{x} = Ax + B_2 u + B_1 w$$

$$y = Cx \quad (9)$$

where the state vector x, the input vector u, and the disturbance variable w may be defined as $$x = \begin{pmatrix} \tau_e \\ \omega_e \\ \omega_g \\ \alpha \end{pmatrix}, u = \begin{pmatrix} \tau_e^{cmd} \\ \tau_g \end{pmatrix}, w = \omega_r \quad (10)$$

The state vector includes engine torque, engine speed, generator speed, and damper angular deflection. Inputs to the system include an engine torque command and a generator torque, and a ring gear speed.

The system coefficient matrices may be derived from equations (4)-(6) and may be defined as $$A = \begin{pmatrix} -\frac{1}{T} & 0 & 0 & 0 \\ \frac{1}{J_e} & 0 & 0 & -\frac{k}{J_e} \\ 0 & 0 & 0 & \frac{k\rho}{J_g(1+\rho)} \\ 0 & 1 & -\frac{\rho}{1+\rho} & 0 \end{pmatrix}, B_2 = \begin{pmatrix} \frac{1}{T} & 0 \\ 0 & 0 \\ 0 & \frac{1}{J_g} \\ 0 & 0 \end{pmatrix},$$ (11)

$$B_1 = \begin{pmatrix} 0 \\ 0 \\ 0 \\ -\frac{1}{1+\rho} \end{pmatrix}$$

$$C = \begin{pmatrix} 0 & 1 & 0 & 0 \\ 0 & 0 & 1 & 0 \end{pmatrix}$$

The two measured output signals may be the engine speed and the generator speed, $y = (\omega_e, \omega_g)^T$. These signals may be obtained directly by speed sensors on the engine and the generator. The resolutions and update rates of these sensor inputs may be different. Therefore, the feedback gains used in the estimator design may be tuned to prioritize the measurement with the higher accuracy and update rate.

Figure 4:
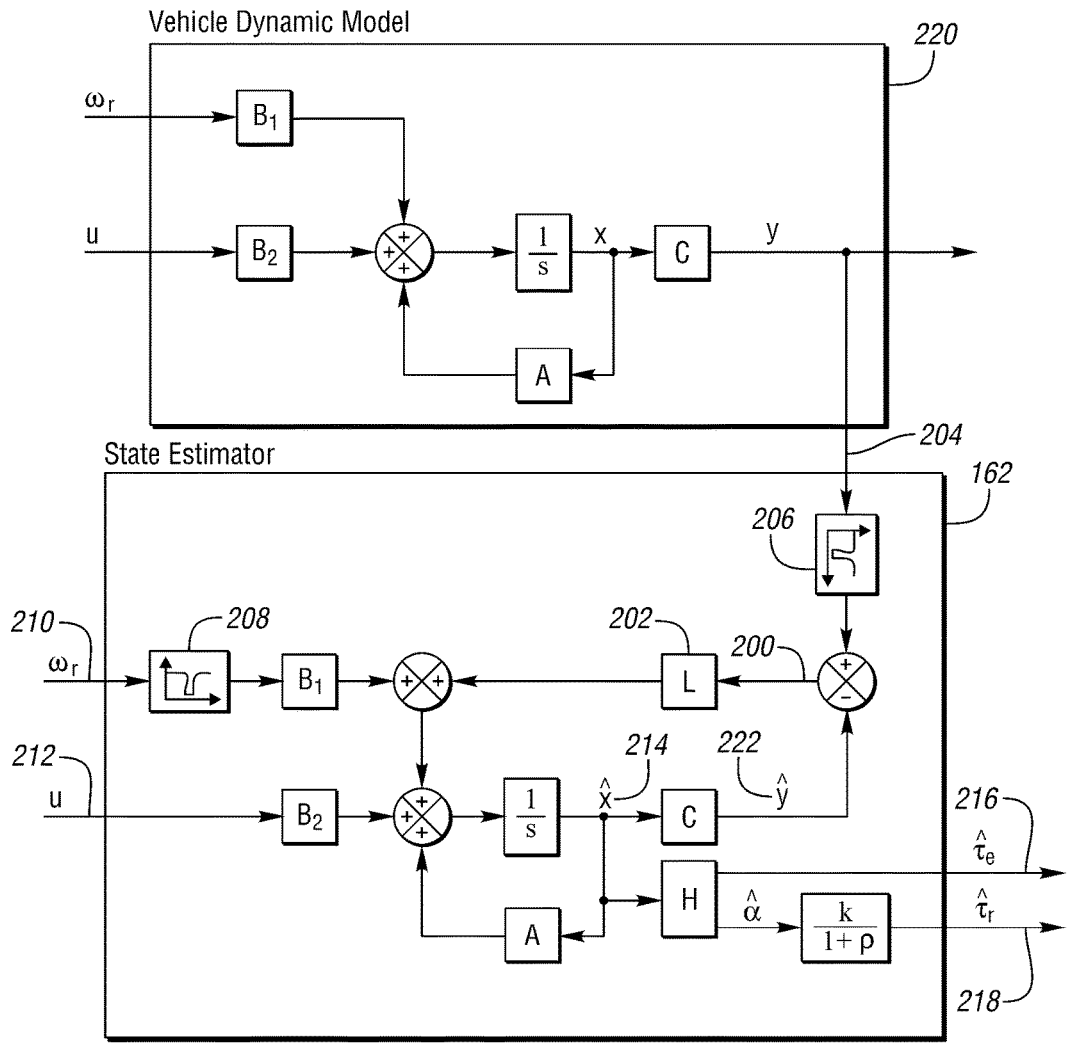
FIG. 4 is a block diagram of a state observer for ring gear torque.

The state observer may have the form $$\dot{\hat{x}} = A\hat{x} + B_2 u + B_1 w + L(y - \hat{y})$$

$$\hat{y} = C\hat{x}$$ (12)

where $\hat{x}$ is the estimated system state, $\hat{y}$ is the estimated output, and L is the gain of the feedback correction term. FIG. 4 hows the diagram of the state observer 162. The observer 162 calculates the error 200 between the measured output (y) 204 and the estimated output ($\hat{y}$) 222 and uses it to adjust the observed state 214. The estimated output 222 may be estimated engine and generator speeds. The dimension of L in this design may be 4 by 2 and L may be expressed as $$L = \begin{pmatrix} L_{11} & L_{12} \\ L_{21} & L_{22} \\ L_{31} & L_{32} \\ L_{41} & L_{42} \end{pmatrix}$$ (13)

The error dynamics between the estimated state and the actual state may be defined as $$\tilde{x} = x - \hat{x}$$ (14)

By combining (9) and (12), one can derive the dynamics of the error to be $$\dot{\tilde{x}} = (A - LC)\tilde{x}$$ (15)

In one example, the state observer 162 may have five inputs and provide two outputs. The state estimator 162 of FIG. 4 depicts a graphical representation of equation (12). A vehicle dynamic model 220 is depicted which represents equation (9). The vehicle dynamic model 220 represents the actual performance of the powertrain system. The output, y 204, of the vehicle dynamic model 220 may be the actual engine speed and generator speed. These inputs may be capable of being measured and processed by a controller in the vehicle and are assumed to be available to the state estimator 162.

The design problem for the observer is to drive the estimator error 200, which is mainly due to the initial error in the value of $\hat{x}(0)$ and the system disturbance to zero. This is a linear multivariable observer design problem. From modern control theory, it is known that a coefficient matrix L 202, which can drive the error state 200 asymptotically to zero, can be found if the system is observable. The system in this design satisfies this condition and multiple design methods may be available for such design. The particular design process is not explicitly discussed here but is known from general control theory principles. As an example, L 202 may be derived by using direct pole placement by modifying L 202 directly. As another example, L 202 may be derived by an indirect method, such as an LQR mechanism, that constructs L 202 without directly altering the pole location. Using either design method, it is assumed that L 202 is found using an appropriate design so that (A-LC) has strict left-half plane poles.

The selection of the design method of L 202 may also be determined based on the confidence in the accuracy of the measurement system output, $y = (\omega_e, \omega_g)^T$ 204. If one measurement of y 204 is more accurate than another, the corresponding column in L 202 may be tuned to have more effect on the convergence of the observer 162.

One special aspect in the designed observer 162 may be the method of handling the measured input to the observer. A band stop filter (206, 208), or a notch filter, may be used to filter the input of the measured ring gear speed 210 and measured engine and/or generator speeds 204. This type of filter is presently used by the vehicle control system in the path of power calculation. However, this filter may not be present in the future generations of vehicle control if a wheel torque based control is implemented. This example adopts a similar filter structure in the speed feedback path of the torque estimation to improve the robustness to driveline oscillations. The reason for using a notch filter is to remove the frequency content of the resonance of the driveline oscillation so that the ring gear torque estimation will be robust to the driveline dynamics. The use of the notch filter is optional.

Figure 5:
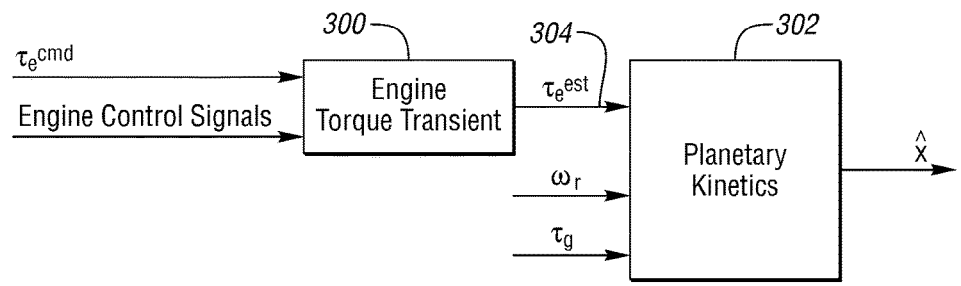
FIG. 5 is a block diagram using an engine model in the state observer.

The observer 162 as described uses a commanded engine torque as one of the inputs 212. It may be desirable to use the actual engine torque as the input to the observer. As an engine torque sensor is not typically available, an estimate of the engine torque may be used instead. Different methods of modeling the response of the engine to a torque command are available. Other inputs 212 may include the generator torque, which may be a requested generator torque or a measured or estimated generator torque. As shown in FIG. 5, such an observer may consist of two parts: an engine transient torque estimation 300 ($x_1$) and the planetary kinetics estimation 302 ($x_2$-$x_4$). The engine torque estimation feature 300 may provide more information to predict the output torque 304 on the engine crankshaft. A higher order model may also be used for the torque generation. In such situations, the engine torque modeling may be replaced but other portion of the system dynamics may remain the same. The system coefficient matrices (A, B, C) may be changed, but the method for the ring gear torque estimation will be same as the shown in FIG. 4.

Referring again to FIG. 4, the state variables 214 may be estimated from the observer 162. The unmeasured variables in this example are $x_1$ and $x_4$. The outputs of the observer (216, 218) may be a function of the two unmeasured state variables as follows $$z = Hx = \begin{pmatrix} \hat{\tau}_e \\ \hat{\tau}_r \end{pmatrix}$$

$$H = \begin{pmatrix} 1 & 0 & 0 & 0 \\ 0 & 0 & 0 & \frac{k}{1+\rho} \end{pmatrix}$$

(16)

The output of the observer may include an estimate of the ring gear torque 218. The estimated ring gear torque 218 may then be used in equation (7) to calculate the motor torque that is necessary to satisfy the driver torque demand. The state estimation may be based on a deviation of the estimated engine speed from the measured or actual engine speed. The state estimation may be based on a deviation of the estimated generator speed from the measured or actual generator speed. In other words, the estimate may be based on error between an actual and estimated engine speed and an error between an actual and estimated generator speed.

The disclosed examples have several advantages over prior systems. The system provides an estimate of the damper deflection that may be used for other applications. The ring gear torque may be estimated without explicit usage of any acceleration signal so that robustness to measurement noise is improved. The positive feedback of the driveline resonance to the torque calculation is removed by the notch filter achieving a damping effect for the system. The transient torque on the carrier and the ring gear may be estimated accurately by knowing the deflection of the damper. The robustness of the transient motor torque control is improved by removal of the positive feedback. The accuracy of the motor torque control is improved during the transient due to more accurate knowledge of the ring gear torque under the transient deflection of the damper.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a motor coupled to a driveline;
a planetary gearset having each gear coupled to one of the driveline, an engine and a generator; and
a controller programmed to control the motor according to a difference between a driver torque demand and an estimated torque at the motor produced by the engine and generator based on an error between actual and estimated engine speed and an error between actual and estimated generator speed.

2. The vehicle of claim 1 wherein the estimated torque is further based on a commanded engine torque.

3. The vehicle of claim 1 wherein the estimated torque is further based on an estimated engine torque.

4. The vehicle of claim 1 wherein the estimated torque is further based on a generator torque.

5. The vehicle of claim 1 wherein the planetary gearset is configured to couple the driveline via a ring gear of the planetary gearset and the estimated torque is proportional to a torque at the ring gear.

6. The vehicle of claim 5 wherein the estimated torque is further based on a speed of the ring gear.

7. The vehicle of claim 5 wherein the estimated torque is further based on a speed of the ring gear filtered through a band stop filter to improve robustness to driveline dynamics.

8. The vehicle of claim 1 wherein the error between actual and estimated engine speed is a difference between a measured engine speed filtered through a band stop filter and the estimated engine speed.

9. The vehicle of claim 1 wherein the error between actual and estimated generator speed is a difference between a measured generator speed filtered through a band stop filter and the estimated generator speed.

10. A method for controlling a traction motor in a vehicle comprising:
controlling, by at least one controller, traction motor torque according to a difference between a driver torque demand and an estimated torque at the traction motor produced by an engine and a generator, wherein the estimated torque is based on an error between actual and estimated engine speed and an error between actual and estimated generator speed.

11. The method of claim 10 further comprising filtering at least one of a measured engine speed and a measured generator speed through a band stop filter to improve robustness to driveline dynamics.

12. The method of claim 10 wherein the estimated torque is further based on a commanded engine torque, an estimated engine torque, or a generator torque.

13. The method of claim 10 wherein the estimated torque is an output of a state observer configured to drive the errors toward zero.

14. A powertrain comprising:
a driveline;
an engine;
a generator;
a planetary gearset having each gear coupled to one of the driveline, the engine and the generator;
a traction motor coupled to the driveline; and
at least one controller programmed to control the traction motor according to a difference between a driver torque demand and an estimated torque at the traction motor produced by the engine and the generator, wherein the estimated torque is based on a deviation in an estimated engine speed and a deviation in an estimated generator speed.

15. The powertrain of claim 14 wherein the deviation in the estimated engine speed is a difference between a measured engine speed filtered through a band stop filter and the estimated engine speed to improve robustness to driveline dynamics.

16. The powertrain of claim 14 wherein the deviation in the estimated generator speed is a difference between a measured generator speed filtered through a band stop filter and the estimated generator speed to improve robustness to driveline dynamics.

17. The powertrain of claim 14 wherein the planetary gearset is configured to couple the driveline via a ring gear of the planetary gearset and the estimated torque is a torque produced by the engine and the generator at the ring gear.

18. The powertrain of claim 17 wherein the estimated torque is further based on a speed of the ring gear.

19. The powertrain of claim 17 wherein the estimated torque is further based on a speed of the ring gear filtered through a band stop filter to improve robustness to driveline dynamics.

20. The powertrain of claim 14 wherein the estimated torque is estimated using a state observer including a model of the driveline.

* * * * *